US011763798B2

(12) United States Patent
Laput et al.

(10) Patent No.: US 11,763,798 B2
(45) Date of Patent: *Sep. 19, 2023

(54) SYSTEM AND METHOD FOR ACOUSTIC ACTIVITY RECOGNITION

(71) Applicant: Carnegie Mellon University, Pittsburgh, PA (US)

(72) Inventors: Gierad Laput, Pittsburgh, PA (US); Karan Ahuja, Pittsburgh, PA (US); Mayank Goel, Pittsburgh, PA (US); Christopher Harrison, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/377,347

(22) Filed: Jul. 15, 2021

(65) Prior Publication Data
US 2022/0005454 A1 Jan. 6, 2022

Related U.S. Application Data

(63) Continuation of application No. 16/539,586, filed on Aug. 13, 2019, now Pat. No. 11,069,334.
(Continued)

(51) Int. Cl.
G10L 21/0324 (2013.01)
G10L 13/033 (2013.01)
G10L 15/18 (2013.01)

(52) U.S. Cl.
CPC ............ G10L 13/033 (2013.01); G10L 15/18 (2013.01); G10L 21/0324 (2013.01)

(58) Field of Classification Search
None
See application file for complete search history.

(56) References Cited

U.S. PATENT DOCUMENTS 8,831,763 B1 9/2014 Sharifi et al.
8,832,308 B2 9/2014 Tsutsui
(Continued)

OTHER PUBLICATIONS

Office Action dated Dec. 4, 2020 for U.S. Appl. No. 16/539,586, 30 pages.
(Continued)

Primary Examiner — Jesse S Pullias
(74) Attorney, Agent, or Firm — AMIN, TUROCY & WATSON, LLP

(57) ABSTRACT

Embodiments are provided to recognize features and activities from an audio signal. In one embodiment, a model is generated from sound effect data, which is augmented and projected into an audio domain to form a training dataset efficiently. Sound effect data is data that has been artificially created or from enhanced sounds or sound processes to provide a more accurate baseline of sound data than traditional training data. The sound effect data is augmented to create multiple variants to broaden the sound effect data. The augmented sound effects are projected into various audio domains, such as indoor, outdoor, urban, based on mixing background sounds consistent with these audio domains. The model is installed on any computing device, such as a laptop, smartphone, or other device. Features and activities from an audio signal are then recognized by the computing device based on the model without the need for in-situ training.

20 Claims, 8 Drawing Sheets

Related U.S. Application Data

(60) Provisional application No. 62/764,635, filed on Aug. 13, 2018.

(56) References Cited

U.S. PATENT DOCUMENTS

| | | |
|---|---|---|
| 11,069,334 B2 * | 7/2021 | Laput .................... G10L 15/18 |
| 2001/0044719 A1 | 11/2001 | Casey |
| 2015/0112687 A1 | 4/2015 | Bredikhin |
| 2016/0118039 A1 | 4/2016 | Moon et al. |
| 2017/0287498 A1 | 10/2017 | Petkov et al. |
| 2018/0122353 A1 | 5/2018 | Braasch et al. |
| 2019/0103005 A1 | 4/2019 | Gilberton et al. |

OTHER PUBLICATIONS

Lane et al. "Deep Ear: Robust Smartphone Audio Sensing in Unconstrained Acoustic Environments using Deep Learning". UniComp '15, Sep. 8-11, 2015, Osaka, Japan (Year: 2015).

Gao et al. "iHearFood: Eating Detection Using Commodity Bluetooth Headsets". 2016 IEEE First Conference on Connected Health: Applications, Systems, and Engineering Technologies (Year 2016).

* cited by examiner

700

SYSTEM AND METHOD FOR ACOUSTIC ACTIVITY RECOGNITION

CROSS-REFERENCE TO RELATED APPLICATIONS

This patent application is a continuation application that claims priority to U.S. patent application Ser. No. 16/539,586, filed Aug. 13, 2019, entitled "SYSTEM AND METHOD FOR ACOUSTIC ACTIVITY RECOGNITION," which patent application is a non-provisional patent application of U.S. provisional application No. 62/764,635, filed Aug. 13, 2018, entitled "SYSTEM AND METHOD FOR ACOUSTIC ACTIVITY RECOGNITION WITHOUT IN-SITU TRAINING," which applications are hereby incorporated by reference in their entirety.

BACKGROUND

The subject disclosure relates to recognition of any type of activity using acoustics that are associated with that activity. There are many approaches to sense human environments, including computer vision, power line sensing, Radio Frequency ID tags, geophones, and water pressure sensors. Microphones are the most common sensor found in consumer electronics today, from smart speakers and phones, to tablets and televisions. Despite sound being a rich information source, computing devices with microphones do not leverage audio to glean useful insights about their physical and social context. For example, a smart speaker sitting on a kitchen countertop cannot figure out if it is in a kitchen, let alone know what a user is doing in the kitchen. Another example is a smartwatch on a user's wrist that is oblivious to its owner cooking or cleaning. The inability for devices to recognize what is happening around them in the physical world is a major impediment to them truly supporting and augmenting human activities.

Attempts for real-time, sound-based classification of activities suffer from major limitations. There are several machine learning models capable of recognizing certain features from an audio signal, such as speech. The known models, however, rely heavily on training from large audio datasets to classify sound events, such as different words, coughing, rain, gunshot, etc. Many of these models focus on a constrained set of recognized classes. In these types of constrained uses, the training data for machine learning is generally domain-specific and captured by the researchers themselves. Accordingly, the known models and machine learning/artificial intelligence audio recognition tools continue to require large training datasets and significant amounts of time to develop useful application.

Apart from classifying events, audio has also been used for scene and context recognition. But the known devices fail to take advantage of acoustic context. While there are many portable systems proposed for real time audio-based sensing environments, these systems suffer when used in broad applications because they require training within the user's environment, and they focus on specific domain and device. Unfortunately, the requirements for large quantities of context specific training data have made broad activity recognition from sound unachievable in most real-world applications.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later.

In one embodiment, a method comprises accessing a first set of sound effects from a sound effects database for a selected audio context. The sound effects are augmented to generate an augmented set of sound effects and projected into an acoustic domain based on mixing the augmented set of sound effects with one or more background sounds that are consistent with the acoustic domain. A training data set is assembled based on the augmented set of sound effects and the projections of the augmented set of sound effects. A model is generated that recognizes at least one feature in an audio signal based on the training dataset.

In another embodiment, a system comprises: an input that receives sound effect data from a sound effects database; an acoustic processing system that augments the sound effect data and projects the augmented sound effect data into an acoustic domain to generate a training dataset.

In another embodiment, a computing device comprises: a microphone that receives an audio signal; a memory that stores program code for a model trained on a training dataset that has been generated from sound effect data retrieved from a sound effect database and that has been expanded into augmented sound effect data using one or more augmentations and projected into a plurality of audio domains based on mixing the augmented sound effect data with one or more background sounds consistent with each of the plurality of audio domains; and a processor executing the program code for the model to recognize at least one feature in an audio signal without requiring in situ training.

BRIEF DESCRIPTION OF THE DRAWINGS

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For simplicity of explanation, the methodologies and/or computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

DETAILED DESCRIPTION

Figure 1:
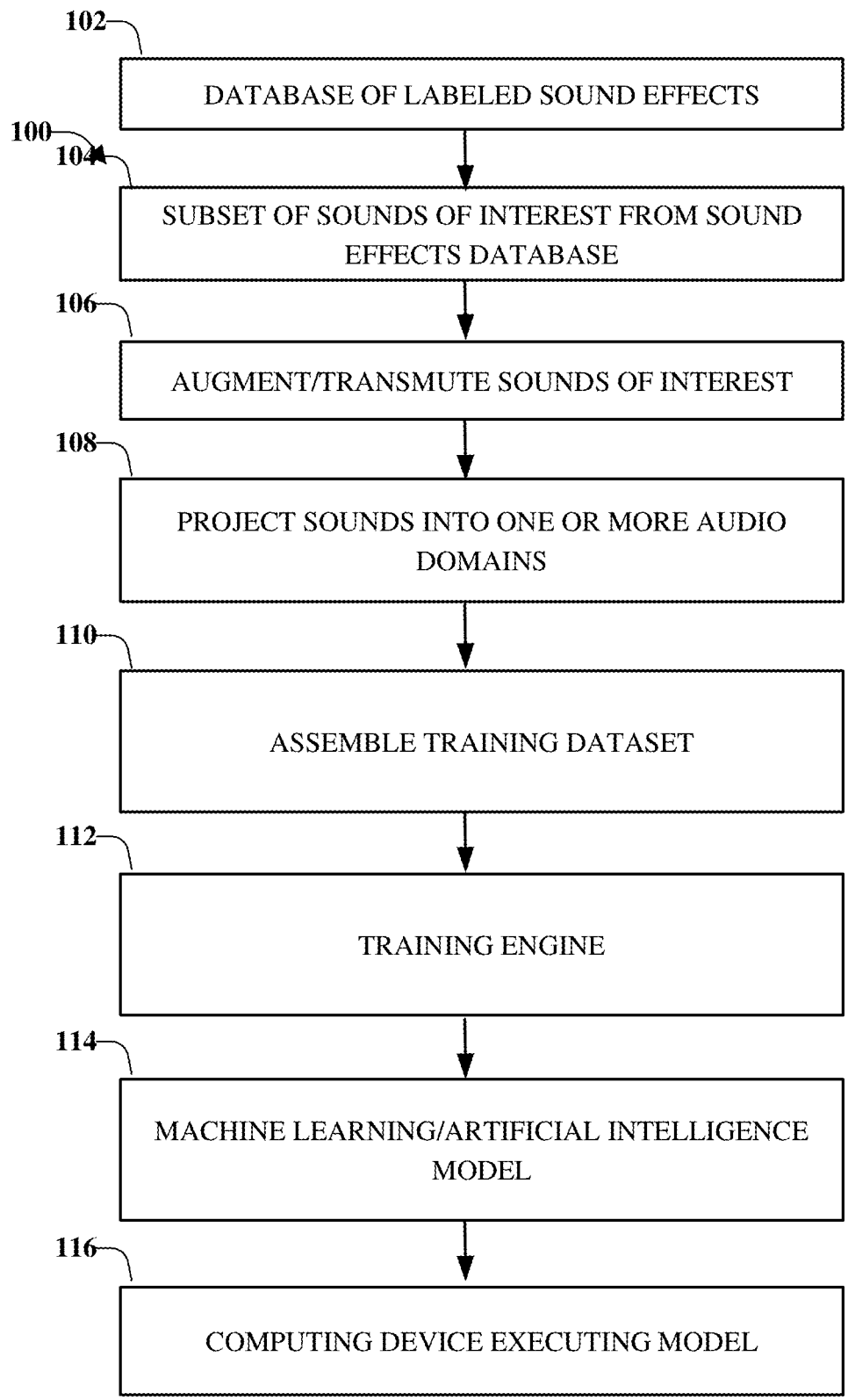
FIG. 1 illustrates an exemplary data flow for generating and installing a model on a computing device in accordance with an embodiment of the present disclosure.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Methods and systems are provided to enable recognizing any form of activity based on sensing the audio that results from the activity. In one embodiment, ubiquitous acoustic (ubicoustic) activity sensing is enabled by using sound effect data that is augmented and projected into various audio domains to form a training dataset without requiring lengthy in situ training. A context for the acoustic activity sensing is defined. The acoustic context provides classes of sounds that are considered relevant. A sound effect database is then accessed and mined based on the classes defined by the acoustic context. The resulting set of sound effects is pre-processed. Pre-processing can include format standardization. The sound effects can then be augmented using augmentations for amplitude, persistence, reverberation, equalization/non-linear damping. In addition, the augmented sound effects can be projected by mixing and combining sounds that are consistent with a variety of audio domains, such as indoor, outdoor, urban, etc. The sound data is assembled to form a training dataset. Once the sound dataset is assembled, various features can be calculated. A model is then generated and recognizes these features. Of note, the model can recognize the features without requiring lengthy in situ training. The model can be deployed locally or streamed to a computing device. Based on the model, the computing device can receive audio, e.g., resulting from any form of activity, from its surroundings and recognize features in the audio signal and the activity.

Rather than requiring large training datasets or in-situ collection of data, the methods and systems employ sound effect data. Sound effect data refers to any sound data that has been artificially created or enhanced from sounds or sound processes. Accordingly, one or more embodiments can enable ubiquitous sensing of activity from acoustic data and this capability can be deployed in a plug and play fashion since it does not require substantial training.

The system and methods described herein are believed to provide comparable or superior accuracies (both in terms of recognition accuracy and false positive rejection), while overcoming the limitations of the previous systems by offering a richer set of activities and without in situ training.

Furthermore, other complementary sensing systems can be enhanced with this system. For example, sensing channels beyond audio (e.g., accelerometer, infrared, electromagnetic, visual, etc.) can be used for also digitizing physical events in the environment to supplement the audio data. In one embodiment, the methods and systems can be used as a metadata layer providing predictions for the events performed (e.g., typing, chopping, tool usage).

Referring now to FIG. 1, an exemplary data flow 100 is illustrated for generating and installing a model on a computing device in accordance with an embodiment of the present disclosure. This data flow is provided to assist in illustrating an exemplary concept of an embodiment. Repetitive description of like elements employed in other embodiments described herein is omitted for sake of brevity.

Figure 3:
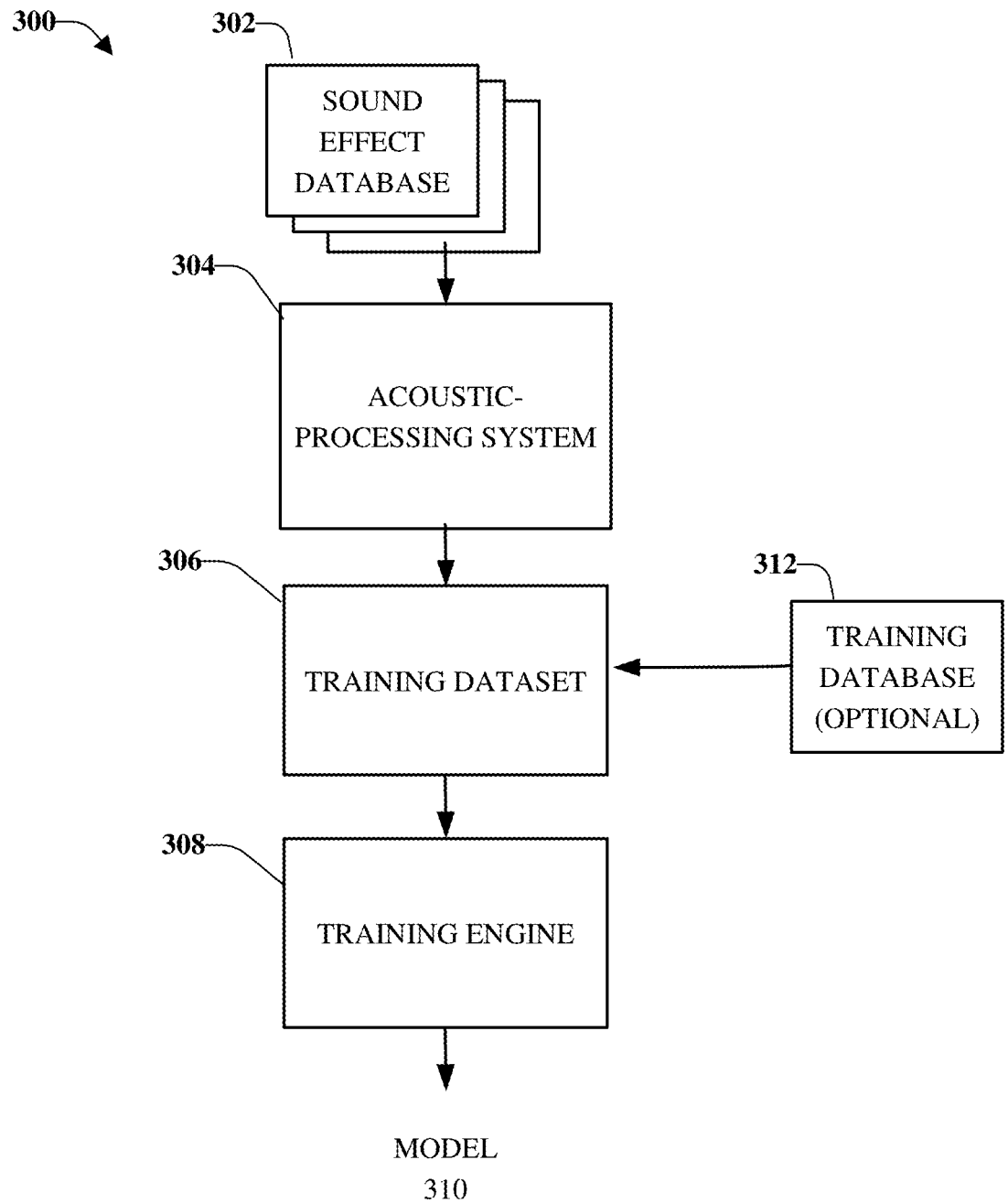
FIG. 3 an exemplary system for generating a model in accordance with an embodiment of the present disclosure.

In phase 102, a database of labeled sound effects is accessed (such as database 302 shown in FIG. 3). Sound effects are sounds that have been artificially created or enhanced from a sound or sound process. In some embodiments, sound effect database 302 can be an existing database, such as, British Broadcasting Corporation (BBC) Sound Library, Network Sound Library, Soundsnap, FreeSound, and AudioSet. Any type of sound effect database known to those skilled in the art can be used in the embodiments.

Sound effects are utilized in the embodiments for several reasons. First, sound effects are atomic in nature. For example, a sound effect labeled as "door knock" or "cat meow" is tightly segmented and contains only that one sound. Secondly, sound effects can be considered pure in content. That is, clips of a sound effect are generally recorded in professional studios and are devoid of artifacts like background noise and echoes. This is typical of sound effects because the sounds are meant to be transformed and composited into other soundscapes, for example, for use in post-production of movies, etc. Third, sound effect libraries are diverse. The various sound effect libraries are known for use by post-production sound editors to provide a desired, matching sound, e.g., based on the materials in the scene and mood of the shot. For this reason, the libraries in sound effect database 302 can contain a large number of variations of the same sound effect.

In phase 104, a subset of sounds of interest, such as sounds of interest 204 (shown in FIG. 2) are pulled/retrieved from the sound effects database, such as sound effect database 302 (shown in FIG. 3) to define an acoustic context of use and are assembled into a corpus of sound effects. For example, an acoustic context can be a construction site, hospital, dentist office, office, restaurant, and so forth.

Example contexts include classes, such as 1) bathroom, 2) bedroom, 3) house entrance, 4) kitchen, 5) office, 6) outdoors, and 7) workshop, and so forth. Any number of contexts and corresponding classes can be determined in the embodiments. These contexts provide a practical a priori reflecting realistic scenarios. For instance, it is highly unlikely for a "blender" event to occur in the bathroom, or for "chopping" to happen in the bedroom. For each context, commonplace events can be selected to assist in recognition.

These classes can be pulled/retrieved from sound effect libraries in sound effect database 302, for example, by using the name of the class itself as a search term, keyword variation (e.g., not just "faucet", but also "water running", "water flowing", "tap dripping", etc.).

In one embodiment, the corpus of sound effects is standardized into a common file format. This is because sound effects in sound effect database 302 and libraries can come in different formats (e.g., waveform audio files, audio interchange file format, MP3, etc.), bit depths (8 to 32 bits), sample rates (16 to 48 kHz), and number of channels (mono to 7.1 surround sound). In one embodiment, the sound pre-processing system 304 standardizes the sound effects into 16 kHz mono (16-bit integer) as a standard format. In addition, once standardized, sound pre-processing system 304 identifies any silences greater than one second and remove them.

In phase 106, the corpus of sound effects (now standardized) are broadened using various augmentations to form an augmented set of sound effects. Augmentations can be any type of transmutation or transformation of sound properties, such as amplitude, persistence, reverberation, equalization/non-linear damping, and so forth. The embodiments can apply augmentation alone or in combination to create any number of variations of the sound effects.

Figure 6:
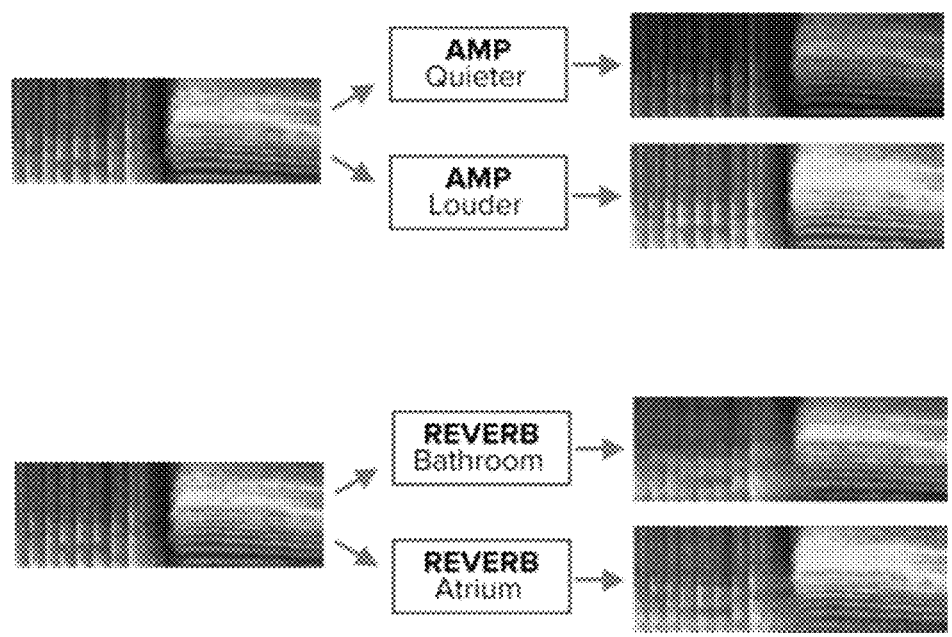
FIG. 6 illustrates exemplary amplification augmentations and persistence augmentations applied to a sound effect that can be employed in one or more processes described herein in accordance with an embodiment of the present disclosure.

Some exemplary augmentations will now be further described. For example, an amplitude augmentation can produce two variations for each input sound. One variant can be a quieter version (e.g., 25% of original volume), and another variant can be louder (e.g., by raising peak amplitude to −0.1 dB). FIG. 6 visually illustrates exemplary amplification augmentations that can be employed in an embodiment of the present disclosure.

As another example, a persistence augmentation of a sound effect can include reverberations and non-linear damping. By modifying these parameters, the sound across a variety of physical spaces (e.g., bathroom, atrium, kitchen, office, exterior, etc.) can be created from the original corpus of selected sound effects. FIG. 6 also provides a visual illustration of some persistence augmentations that can be employed in an embodiment of the present disclosure. In one embodiment, the convolution reverbs are applied by capturing impulse functions in exemplary rooms: a bathroom, large atrium, workshop and small office, and so forth. To improve accuracy, augmentations can be applied in a specific order.

In phase 108, the augmented sound effects are projected into various audio domains. In one embodiment, this is accomplished by using the additive property of sound and blending or mixing the sound effects and augmented sound effects with background sounds. This projection introduces foreign elements to original sounds, adding more variability. For example, each input sound effect and its variants can be mixed with a randomly selected background segment, such as indoor (e.g., air conditioning noises), outdoor (e.g., birds chirping), urban (e.g., vehicle traffic), and social (e.g., a cafe) background noises.

In one embodiment, augmentations can be stacked, combined, and projected in various ways to create variety. For example, a "brushing teeth" sound effect can be augmented to make it louder, augmented again with a bathroom-like reverberation, and projected into an indoor audio domain by mixing in fan background noise.

In phase 110, the sound effects, augmented sound effects, and projections are assembled into a training dataset, which is then provided to a training engine.

In phase 112, a training engine operates on the training dataset and calculates various features that can be recognized. In one embodiment, the acoustic processing system 304 comprises a training engine to compute features based on segmenting files into audio segments (e.g., 960 ms) and computing short-time Fourier Transforms for each segment (e.g., using a 25 ms window and a step size of 10 ms). This calculation yields a spectrogram (e.g., 96-length). Next, the acoustic processing system 304 can derive log-transformed Mel-frequency cepstral coefficients (MFCC) features (e.g., of 64 bins) from the spectrogram, producing an input frame for every audio segment.

In phase 114, acoustic processing system 304 provides its output to a model generator (such as model generator 306 shown in FIG. 3). In one embodiment, model generator 306 generates a model based on the VGG16 convolutional network and architecture. Other model architectures can also be used in the embodiments.

In phase 116, the model is installed and executed onto a computing device, such as a laptop, smartphone, etc. Various example applications of the model installed on a computing device are further described with reference to FIGS. 3 and 4. Of note, as a result of using sound effect data that has been augmented and projected, the model can recognize a wide variety of features from many types of activities without requiring in situ training. Optionally, the model can be improved or further refined with in situ training. However, in one embodiment, the model can begin execution in a plug and play manner.

Figure 2:
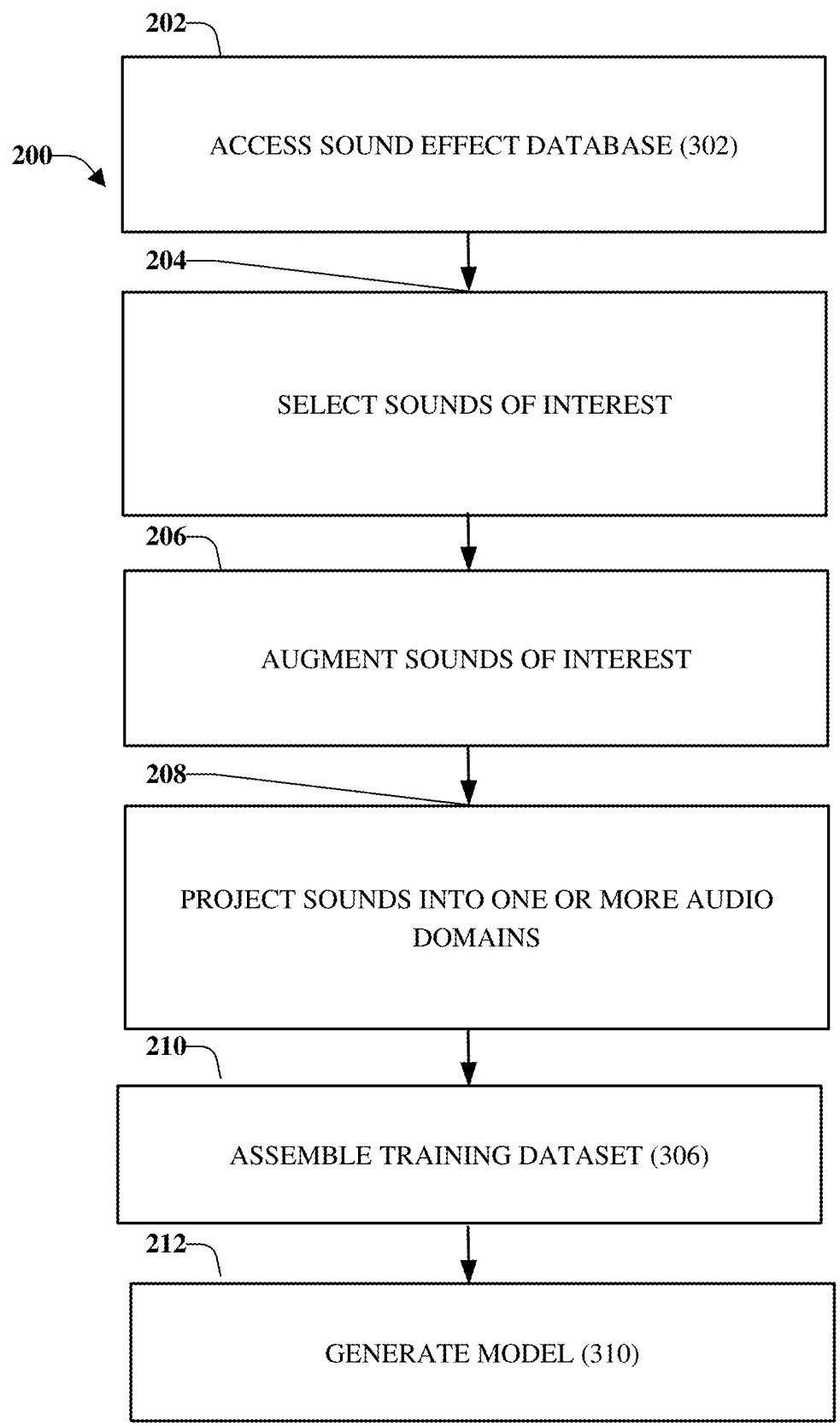
FIG. 2 illustrates an exemplary process flow for generating a model that recognizes at least one feature in an audio signal in accordance with an embodiment of the present disclosure.

Referring now to FIG. 2, an exemplary process flow 200 is illustrated for generating and installing a model on a computing device in accordance with an embodiment of the present disclosure. Repetitive description of like elements employed in other embodiments described herein is omitted for sake of brevity.

In phase 202, a sound effect database (such as sound effect database 302) is accessed and various sound effects are selected for an acoustic context. The sound effect database 302 can be any database of sound effects, which are sounds that have been artificially created or enhanced from a sound or sound process. In some embodiments, sound effect database 302 can be an existing database, such as, BBC Sound Library, Network Sound Library, Soundsnap, FreeSound, and AudioSet.

In one embodiment, in phase 204, an acoustic processing system 304 assembles the corpus of sound effects covering the classes of interest and standardizes the sound effects to select various sounds of interest. Because sound effects in sound effect database 302 and libraries can come in different formats (e.g., waveform audio files, audio interchange file format, MP3, etc.), bit depths (8 to 32 bits), sample rates (16 to 48 kHz), and number of channels (mono to 7.1 surround sound). In one embodiment, the acoustic processing system 304 standardizes the sound effects into 16 kHz mono (16-bit integer) as a standard format. In addition, once standardized, acoustic processing system 304 can identify any silences greater than one second and remove them.

Once standardized, sound effects from sound effect database 302 can be transformed into hundreds of variations by adjusting audio properties such as amplitude, persistence, reverberation, equalization, and non-linear damping.

In phase 206, the sound effects for the various sounds of interest are then augmented (for example, by acoustic processing system 304). In one embodiment, the acoustic processing system 304 can apply multiple types of augmentation alone or in combination.

Some exemplary augmentations will now be further described. For example, the acoustic processing system 304 can apply an amplitude augmentation to produce two variations for each input sound. One variant can be a quieter version (e.g., 25% of original volume), and another variant can be louder (e.g., by raising peak amplitude to −0.1 dB). FIG. 6 visually illustrates an amplification augmentation.

The acoustic processing system 304 can also apply a persistence augmentation of a sound effect, which can include reverberations and non-linear damping. By modifying these parameters, the acoustic processing system 304 can simulate sounds across a variety of physical spaces (e.g., bathroom, atrium, kitchen, office, exterior, etc.). FIG. 6 also provides a visual illustration of some persistence augmentations.

In one embodiment, the acoustic processing system 304 can use reverb effects provided in an available sound effects library from sound effect database 302. In addition, the acoustic processing system 304 can apply convolution reverbs by capturing impulse functions in exemplary rooms: a bathroom, large atrium, workshop and small office, and so forth.

In phase 208, the acoustic processing system 304 can project the sound effects and augmented variants of the sound effects into an audio domain by blending or mixing these sound effects with background sounds consistent with various audio domains. This projection introduces foreign elements to original sounds, to thus add more variability. For example, each input sound effect and its augmentation variants can be mixed with a randomly selected background segment, such as indoor (e.g., air conditioning noises), outdoor (e.g., birds chirping), urban (e.g., vehicle traffic), and social (e.g., a cafe) background noises.

Acoustic processing system 304 can stack and combine augmentations, creating even greater variety. For example, acoustic processing system 304 can take a "brushing teeth" sound effect and make it louder, apply a bathroom-like reverberation, and mix in fan background noise.

To improve accuracy, the acoustic processing system 304 can apply the augmentations in a specific order. For example, background tracks can already include reverb, as they are recorded on location, and thus re-projecting them into a second environment leads to less realistic output.

In phase 210, acoustic processing system 304 assembles a training dataset from the sound effects, their augmentations, and the projections into various audio domains. In one embodiment, the acoustic processing system 304 computes the features based on segmenting files into audio segments (e.g., 960 ms) and computing short-time Fourier Transforms for each segment (e.g., using a 25 ms window and a step size of 10 ms). This calculation yields a spectrogram (e.g., 96-length). Next, the acoustic processing system 304 can derive log-transformed Mel-frequency cepstral coefficients (MFCC) features (e.g., of 64 bins) from the spectrogram, producing an input frame for every audio segment. Acoustic processing system 304 then feeds this feature stack into a model generator (e.g., model generator 306).

In phase 212, a model is generated (for example by training engine 308). In one embodiment, model generator 306 generates a model based on the VGG16 convolutional network and architecture. Other model architectures can also be used in the embodiments.

In one embodiment, the model generator 306 can also tune the model based on the sound effects from sound effect database 302. Models tuned on sound effects can achieve superior accuracy to those trained on traditional training data alone because of the characteristics of the sound effect data described above. For example, the methods and systems of the present disclosure can achieve human-level performance, both in terms of recognition accuracy and false positive rejection.

FIG. 3 illustrates an exemplary system for generating a model in accordance with an embodiment of the present disclosure. In one embodiment, the model can be installed onto a computing device, such as a laptop, smartphone, etc.

Non-limiting, example applications that demonstrate the utility of system 300 are summarized and incorporated herein. These examples span a range of contexts across and platforms including, but not limited to, context aware smart assistants, mobile and wearable sensing for healthcare, personal informatics and interruption avoidance. Various example applications will now be further described.

In one exemplary context, system 300 are speakers embedded in consumer smart assistants being integrated into people's living spaces (e.g., kitchen, living room, bathroom). For example, interactions can be implicit, where a smart assistant running on system 300 can proactively provide users with assistive information, such as notifying them when someone is knocking or ringing the front door or reading aloud the next steps for a recipe when an event has been completed (e.g., chopping, blender running) and detected by the recognition provided by process flow 200. Interactions can also be explicit. For example, users can directly program their smart assistant to respond to physical events, enabling various interaction possibilities. For example, users can invoke commands such as "send me a text message when the microwave has finished defrosting," by using the recognition provided by process flow 200.

In another exemplary context, the system 300 is a wearable device, such as a smartwatch. Smartwatches can be advantageous for use by one or more embodiments because they reside on the body, essentially equipping users with a sensor that they carry all the time. Given its proximity to the source of events (e.g., chopping, typing, or tool use), the wearable computing device can provide a useful device on which to apply ubiquitous acoustic activity sensing. In addition, smartwatches also provide an opportunity for health sensing. For example, based on the model running on a smartwatch or other type of wearable, the device can detect when a user coughs more frequently than normal. This could enable tracking the onset of symptoms (e.g., COPD, if monitored by a doctor), or suggest that the user towards preventive measures such as alerting them to get a flu shot or offering to schedule a doctor's appointment.

For systems 300 that are mobile, such as tablets and laptops, the embodiments create interactive opportunities for real-time, acoustic-based audience analysis. For example, in a classroom setting, a tablet application can analyze the ratio between teacher vs. student engagement at granular levels. Presentation software using the model could also analyze which slides invoked discussion (or laughter), and teachers can use this feedback to improve their lessons.

In a classroom setting, system 300 could track and visualize instructional informatics, such as speaker ratio. Beyond audience analysis, a similar system can also be used for personal informatics and interrupt ability detection. For example, the embodiments can be used to garner insight on the amount of meeting time devoted to a day, by examining the ratio between typing vs. talking based on sensing acoustic activity from a laptop.

Furthermore, data from calendars can be fused with such a system to provide useful personal analytics. If a user is busy (e.g., talking, typing, chopping, using tools), systems can use this implicit information to intelligently handle user notifications that limit interruptions.

In one embodiment, audio driven Internet of Things ("IoT") sensors can be used to track equipment use, enabling rich applications that can bridge physical "analog" events with digital interactions. In another embodiment, phones can be used to detect appliance use, which can be used to proactively provide information (e.g., don't' forget to wear safety googles) or launch complementary applications.

For example, if system 300 is a smart speaker or other type of generally stationary device (such as a camera, or microphone), a user could specify a location during setup.

In one embodiment, model 310 can automatically infer its physical context (e.g., kitchen vs. office) based on the audio signal and acoustic context to which it matches. In response, system 300 can automatically load per-context classifiers without user intervention to support a real-time activity recognition system.

The predicted sound class can be a proxy for the origin acoustic context and assist in recognizing one or more features in the audio signal. For example, if the system 300 predicts a microwave sound event, the model 310 can infer that the device is in a kitchen.

When recognizing features in the audio signal, the model 310 can classify clips of the audio signal individually, and the output is used to cast a vote for an acoustic context. Several classes can have special voting logic. For example, if water running is detected, votes for both bathroom and kitchen are cast, and similarly, a knocking sound casts votes for office and entrance.

In addition, the model 310 can include a set of context-free classes (i.e., can happen anywhere) that do not cast any votes. Examples can include classes for a dog bark, cat meow, vacuum, speech, phone ringing, laugh, cough, door, baby cry, and hazard alarm.

After generating, optionally training the model, and tuning it to a user-chosen application space, a context-based weighing scheme can be used to further refine model predictions in real-time for handling unknown sounds. By leveraging sound effect libraries, which (as described above) are pure, atomic, and highly varied, the system 300 can recognize even unknown sounds without requiring users to collect data in-situ or conduct training of the model 310 in-situ.

Sound effect database 302 represents any sound effect database that is used in the embodiments. As noted, in some embodiments, sound effect database 302 can be an existing database, such as, BBC Sound Library, Network Sound Library, Soundsnap, FreeSound, and AudioSet.

In one embodiment, there are three main categories of sound effects: hard, natural, and background sounds. Hard sound effects are closely linked to a specific action or event (e.g., a gunshot, doorbell, coughing, door closing, etc.). Natural sounds are subtle effects that add realism to a scene (e.g., leaves rustling, fabric chafing). Background sounds (e.g., cafe chatter, heating, ventilation and air conditioning (HVAC) hum, engine noise) are used to make scenes more cohesive, smooth breaks in dialogue, and anchor visual transitions. In one embodiment, the system 300 uses hard sounds as the starting data and background and natural sounds for augmentations and mixes As noted above, sound effect database 302 provides sound effects that are artificially created or enhanced, and thus, can be processed in useful ways by system 300. For example, sound effect data is scalable, both in amplitude and duration. Second, sound effect data is transformable, and thus, able to be projected into synthetic environments by altering their equalization ("EQ"), reverb and damping. In this manner, a sound effect from sound effect database 302 can be made to sound like it is in a furnished living room or small bathroom. In addition, since audio is additive, multiple sound effects from sound effect database 302 can be blended together.

Acoustic processing system 304 augments and projects the sound to form a training dataset 306 from the original corpus of sound effects from sound effect database 302. For example, acoustic processing system 304 can process a sound effect and project it by mixing an ambient track, e.g., of a bustling market, quiet library, great outdoors, or just the ambient hum of an air conditioning system. Thus, the acoustic processing system 304 can take a single sound effect and augment and project it into hundreds of realistic variations. When applied to entire sound effect libraries, the acoustic processing system 304 can thus achieve a scale of data for establishing even deep learning models, while retaining all of the benefits of a highly-curated corpus provided from using sound effect data.

Training engine 308 generates the model, such as model 310. In one embodiment, training engine 308 generates a model based on the VGG16 convolutional network and architecture. For example, in one embodiment, training engine 308 generates a model 310 that comprises convolutional layer, intermediary max pool layers, a fully connected embedding layer, and a sigmoid activation function. For example, model 310 can comprise four convolutional layers (e.g., a 3×3 kernel, step size=2, depth=64, 128, 256, and 512, ReLU activation), with intermediary max pool layers, and a 128-wide fully connected embedding layer. In addition, the training engine 308 can tune the model base sound effects from the sound effect database 302.

Training database 312 (optional) can supplement training dataset 306 and be used by training engine 308 to train the model 310. In one embodiment, the training database 312 can be based on the YouTube-8M, VGG-16, which provides 8 million YouTube videos as a training dataset. Other training data sets can be obtained from sources known to those skilled in the art or collected in-situ.

Figure 4:
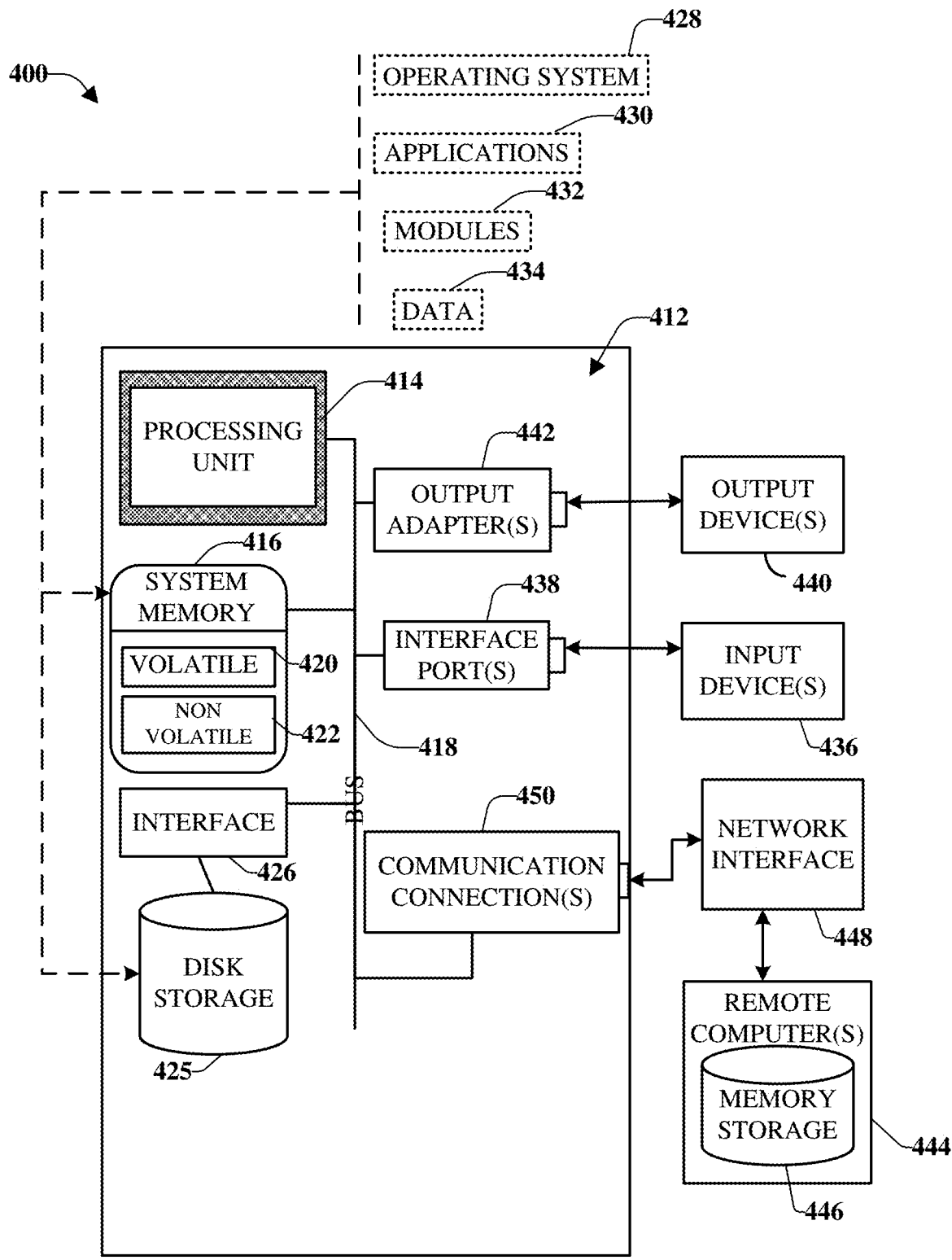
FIG. 4 illustrates an exemplary computing environment and apparatus for performing one or more of the processes described herein in accordance with an embodiment of the present disclosure.

In one embodiment, the model 310 is installed and run locally on a computing device, such as computer 412 (shown in FIG. 4). In another embodiment, the model is streamed to the computer 412 over a network using a cloud infrastructure. Based on the use of sound effects and the pre-processing, the model can run on the computer 412 in a plug and play fashion, for example, without the need for substantial in situ training beforehand. However, if desired, then training of the model can be employed to improve its recognition accuracy and provide feedback. In one embodiment, the computer 412 can conduct training based on the assembled training dataset in combination with a known training dataset, such as the YouTube-8M dataset that comprises over 8 million videos.

FIG. 4 illustrates an exemplary computing environment 400 for performing one or more of the processes described herein in accordance with an embodiment of the present disclosure. Repetitive description of like elements employed in other embodiments described herein is omitted for sake of brevity.

With reference to FIG. 4, a computing environment 400 for implementing various aspects of this disclosure can also include a computer 412. As noted, the computer 412 can be any type of computing device, such as a laptop, smartphone, etc.

The computer 412 can also include a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 416 can also include volatile memory 420 and nonvolatile memory 422.

The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 412 can also include removable/non-removable, volatile/non-volatile computer storage media. FIG. 4 illustrates, for example, a disk storage 424. Disk storage 424 can also include, but is not limited to, devices like a magnetic disk drive, floppy disk drive, tape drive, Jaz drive, Zip drive, LS-100 drive, flash memory card, or memory stick. The disk storage 424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 424 to the system bus 418, a removable or non-removable interface is typically used, such as interface 426.

FIG. 4 also depicts software that acts as an intermediary between users and the basic computer resources described in the suitable operating environment 400. Such software can also include, for example, an operating system 428. Operating system 428, which can be stored on disk storage 424, acts to control and allocate resources of the computer 412. System applications 430 take advantage of the management of resources by operating system 428 through program modules 432 and program data 434, e.g., stored either in system memory 416 or on disk storage 424. It is to be appreciated that this disclosure can be implemented with various operating systems or combinations of operating systems. A user enters commands or information into the computer 412 through input device(s) 436.

Input devices 436 include, but are not limited to, a microphone, a pointing device such as a mouse, trackball, stylus, touch pad, keyboard, joystick, game pad, satellite dish, scanner, TV tuner card, digital camera, digital video camera, web camera, and the like. These and other input devices connect to the processing unit 414 through the system bus 418 via interface port(s) 438. Interface port(s) 438 include, for example, a serial port, a parallel port, a game port, and a universal serial bus (USB).

Output device(s) 440 use some of the same type of ports as input device(s) 436. Thus, for example, a USB port can be used to provide input to computer 412, and to output information from computer 412 to an output device 440. Output adapter 442 is provided to illustrate that there are some output devices 440 like monitors, speakers, and printers, among other output devices 440, which require special adapters. The output adapters 442 include, by way of illustration and not limitation, video and sound cards that provide a method of connection between the output device 440 and the system bus 418. It should be noted that other devices and/or systems of devices provide both input and output capabilities such as remote computer(s) 444.

Computer 412 can operate in a networked environment using logical connections to one or more remote computers, such as remote computer(s) 444. The remote computer(s) 444 can be a computer, a server, a router, a network PC, a workstation, a microprocessor-based appliance, a peer device or other common network node and the like, and typically can also include many or all of the elements described relative to computer 412. For purposes of brevity, only a memory storage device 446 is illustrated with remote computer(s) 444. Remote computer(s) 444 is logically connected to computer 412 through a network interface 448 and then physically connected via communication connection 450.

Network interface 448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 450 refers to the hardware/software employed to connect the network interface 448 to the system bus 418. While communication connection 450 is shown for illustrative clarity inside computer 412, it can also be external to computer 412. The hardware/software for connection to the network interface 448 can also include, for exemplary purposes only, internal and external technologies such as, modems including regular telephone grade modems, cable modems and DSL modems, ISDN adapters, and Ethernet cards.

Figure 5:
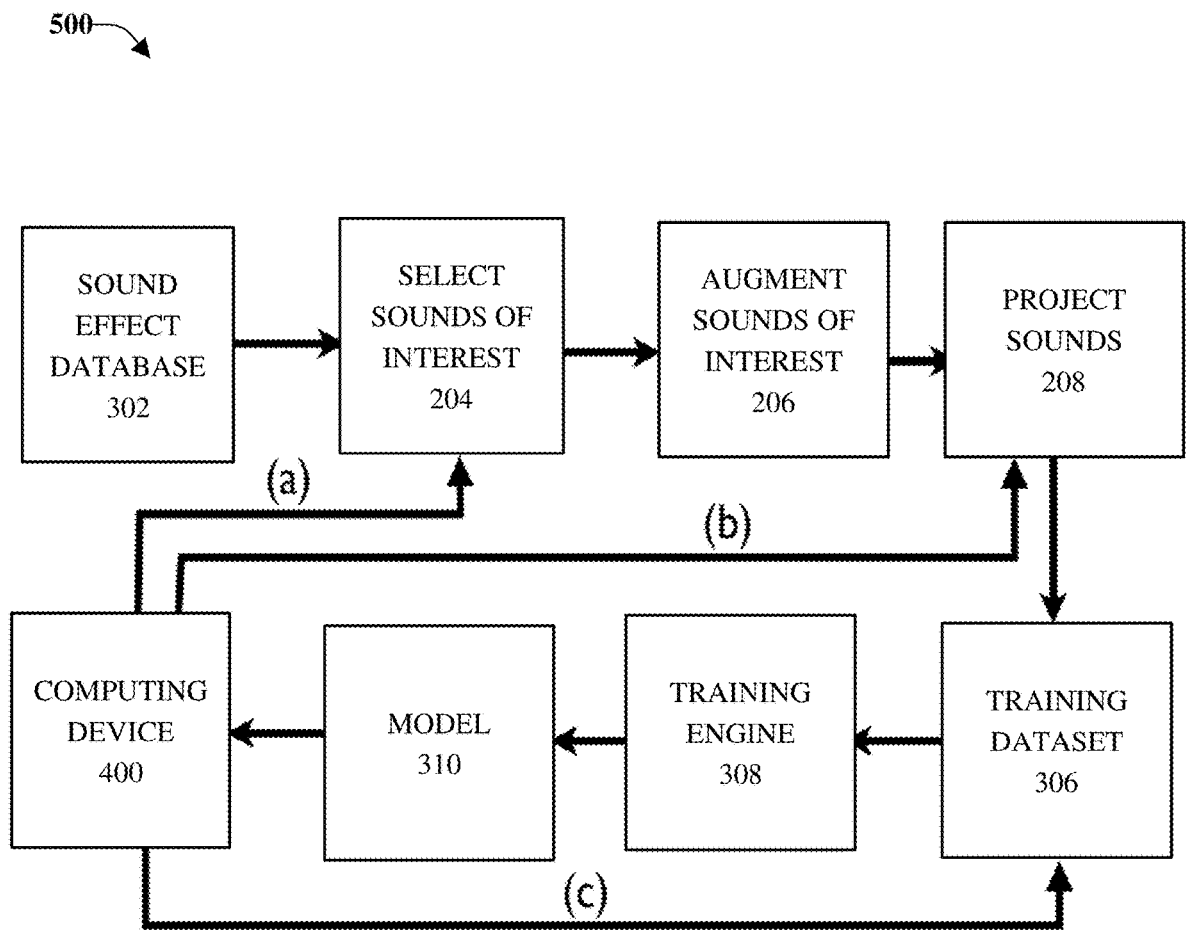
FIG. 5 illustrates an exemplary data flow and process with feedback loops in accordance with an embodiment of the present disclosure.

FIG. 5 illustrates an exemplary data flow and process 500 with feedback loops (a), (b), and (c) in accordance with an embodiment of the present disclosure. Repetitive description of like elements employed in other embodiments described herein is omitted for sake of brevity. The feedback loops (a), (b), and (c) allows for multiple cycles and variants of the data flow 100 (shown in FIG. 1) and the process 200 (shown in FIG. 2).

In one embodiment, the data flow can begin with sound effect database 302 from which sounds of interest are selected (phase 204). As noted, sounds of interest are pulled/retrieved from the sound effects database to define an acoustic context of use and are assembled into a corpus of sound effects. For example, an acoustic context can be a construction site, hospital, dentist office, office, restaurant, and so forth.

In phase 206, the sounds of interest are augmented and/or transmuted to form an augmented set of sound effects. Augmentations can be any type of transmutation or transformation of sound properties, such as amplitude, persistence, reverberation, equalization/non-linear damping, and so forth. The embodiments can apply augmentation alone or in combination to create any number of variations of the sound effects.

In phase 208, the acoustic processing system 304 can project the sound effects and augmented variants of the sound effects into an audio domain by blending or mixing these sound effects with background sounds consistent with various audio domains. This projection introduces foreign elements to original sounds, to thus add more variability. For example, each input sound effect and its augmentation variants can be mixed with a randomly selected background segment, such as indoor (e.g., air conditioning noises), outdoor (e.g., birds chirping), urban (e.g., vehicle traffic), and social (e.g., a cafe) background noises.

Acoustic processing system 304 then assembles a training dataset 306 from the sound effects, their augmentations, and the projections into various audio domains. As noted above, in one embodiment, the acoustic processing system 304 computes the features based on segmenting files into audio segments (e.g., 960 ms) and computing short-time Fourier Transforms for each segment (e.g., using a 25 ms window and a step size of 10 ms). This calculation yields a spectrogram (e.g., 96-length). Next, the acoustic processing system 304 can derive log-transformed Mel-frequency cepstral coefficients (MFCC) features (e.g., of 64 bins) from the spectrogram, producing an input frame for every audio segment. Acoustic processing system 304 then feeds this feature stack into a model generator (e.g., model generator 306).

Training engine 308 generates the model, such as model 310. In one embodiment, training engine 308 generates a model based on the VGG16 convolutional network and architecture.

The model 310 can be installed and run locally on a computing device 400, such as computer 412 (shown in FIG. 4). In another embodiment, the model 310 is streamed to the computer 412 over a network using a cloud infrastructure. Based on the use of sound effects and the pre-processing, the model 310 can run on the computer 412 in a plug and play fashion.

In addition, to improve the model 310, the computing device 400 can provide various feedback data over one or more cycles of the execution of model 310. For example, the computing device 400 can provide feedback in path (a) to aid in the selection of sounds of interest in phase 204. As another example, the computing device 400 can provide feedback to the determination of sound projections generated in phase 208. In addition, the computing device 400 can provide feedback data to the training dataset 306, which then is used by training engine 308. Accordingly, in some embodiments, the data flow and process 500 enables plug and play execution and still allow for feedback and learning.

FIG. 6 illustrates exemplary amplification augmentations and persistence augmentations applied to a sound effect that can be employed in one or more processes described herein in accordance with an embodiment of the present disclosure.

Figure 7:
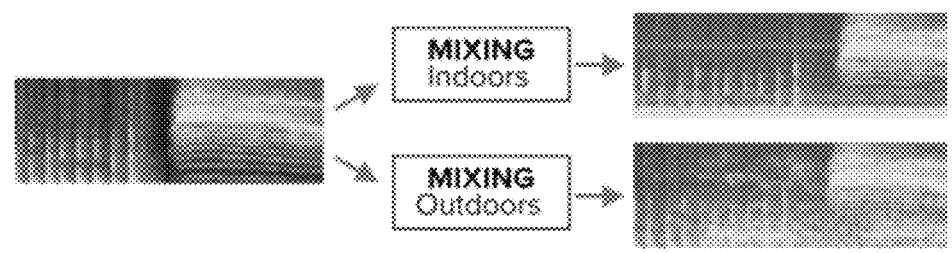
FIG. 7 illustrates an exemplary mixing augmentation applied to a sound effect that can be employed in one or more processes described herein in accordance with an embodiment of the present disclosure.

FIG. 7 illustrates an exemplary mixing augmentation applied to a sound effect that can be employed in one or more processes described herein in accordance with an embodiment of the present disclosure.

Figure 8:
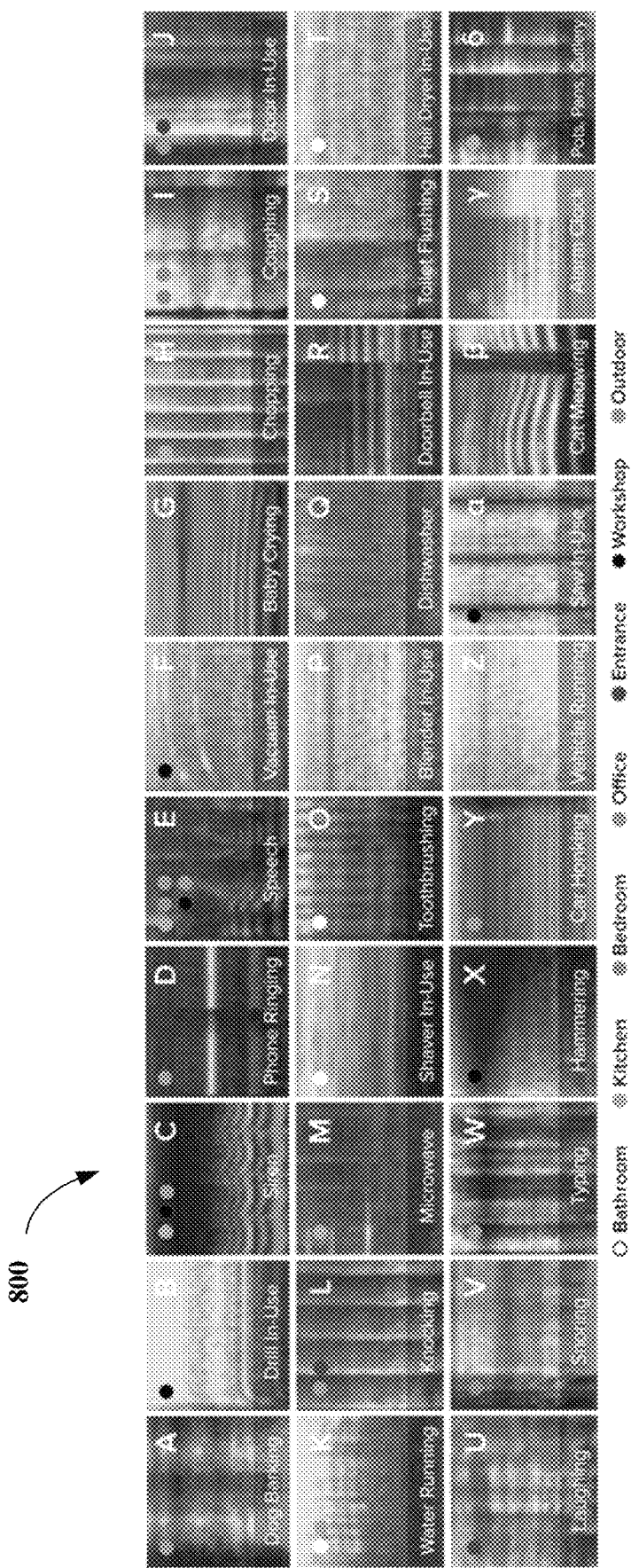
FIG. 8 illustrates exemplary spectrograms that can be employed in one or more processes described herein in accordance with an embodiment of the present disclosure.

FIG. 8 illustrates exemplary spectrograms that can be employed in one or more processes described herein in accordance with an embodiment of the present disclosure. As shown, various exemplary log Mel spectrograms are shown for event classes covered by the model 310.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Matlab, Python or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What is claimed is:

1. A method comprising:
   accessing a first set of sound effects from a sound effects database for a selected audio context;
   transmuting a subset of sound effect data of the first set of sound effects to generate an augmented set of sound effects, wherein the sound effect data comprise data that is tightly segmented and is associated with only one sound;
   casting the augmented set of sound effects into an acoustic domain based on mixing the augmented set of sound effects with at least one sound that at least one of simulates or emulates an environment associated with the acoustic domain to create projections of the augmented set of sound effects;
   assembling a training data set based at least in part on the augmented set of sound effects and the projections of the augmented set of sound effects;
   generating a model that recognizes at least one feature in an audio signal based at least in part on the training dataset;
   receiving, from a computing device having a microphone and employing the model,
   an identified sound of interest, a location of interest associated with an environment of the identified sound of interest, and a captured sound associated with the environment;
   adding the identified sound of interest to the sound effects database;
   using at least one of the location of interest or the environment as a feedback to tune a casting of a sound effect to the environment; and
   using the captured sound to augment the training dataset.

2. The method of claim 1, wherein transmuting the first set of sound effects comprises applying an amplitude augmentation to generate a plurality of variants in the first set of sound effects.

3. The method of claim 2, wherein applying the amplitude augmentation comprises generating a quieter variant in the plurality of variants.

4. The method of claim 2, wherein applying the amplitude augmentation comprises generating a louder variant in the plurality of variants based at least in part on increasing a peak amplitude in the plurality of variants.

5. The method of claim 1, wherein transmuting the first set of sound effects comprises applying a persistence augmentation in the first set of sound effects.

6. The method of claim 5, wherein applying the persistence augmentation comprises applying a reverberation in the first set of sound effects.

7. The method of claim 5, wherein applying the persistence augmentation comprises applying a non-linear damping in the first set of sound effects.

8. The method of claim 1, wherein casting the augmented set of sound effects into the acoustic domain comprises mixing background sounds randomly selected from a group of audio domains comprising indoor, outdoor, urban, and social audio domains.

9. A system comprising:
an input module that receives sound effect data from a sound effects database;
an acoustic processing system that augments a subset of the sound effect data thereby creating augmented sound effect data, wherein the subset comprises data that is tightly segmented and is associated with only one sound, and casts the augmented sound effect data into an acoustic domain to generate a training dataset; and
a model generator that generates an acoustic model to recognize at least one feature in an audio signal based on the training dataset;
wherein the system is configured to receive, from a computing device having a microphone and deploying the model, an identified sound of interest, a location of interest associated with an environment of the identified sound of interest, and a captured sound associated with the environment;
wherein the system is further configured to add the identified sound of interest is to the sound effects database;
wherein the system is further configured to use at least one of the location of interest or the environment as a feedback to tune a casting of a sound effect to the environment; and
wherein the system is further configured to use the captured sound is to augment the training dataset.

10. The system of claim 9, wherein the acoustic processing system applies an amplitude augmentation to the sound effect data to generate a plurality of quieter and louder amplitude variants of the sound effect data.

11. The system of claim 9, wherein the acoustic processing system applies a persistence augmentation to the sound effect data to generate a plurality of reverberation and non-linear damped variants of the sound effect data.

12. The system of claim 9, wherein the acoustic processing system applies a reverb augmentation to the sound effect data.

13. The system of claim 9, wherein the acoustic processing system projects the augmented sound effect data into an audio domain based on mixing the augmented sound effect data with at least one background sounds that are consistent with the audio domain.

14. The system of claim 9, wherein the acoustic model is configured to recognize at least one feature in the audio signal without in situ training.

15. A computing device, comprising:
a microphone that receives an audio signal from an acoustic domain, identifies a sound of interest thereby determining an identified sound of interest, identifies a location of interest associated with an environment thereby creating an identified location of interest, and captures a sound associated with the environment thereby creating a captured sound;
a memory that stores program code for a model trained on a training dataset that has been generated from sound effect data retrieved from a sound effect database, wherein the training data set has been expanded, with augmented sound effect data using at least one augmentation of a subset of the sound effect data, wherein the subset comprises data that is tightly segmented and is associated with only one sound, and projected into a plurality of audio domains based at least in part on mixing the augmented sound effect data with at least one background sound consistent with respective ones of the plurality of audio domains; and
a processor executing the program code for the model to recognize at least one feature in the audio signal associated with the identified sound of interest, the identified location of interest, the environment, or the captured sound;
wherein the device is configured to transmit, to a computer system maintaining the at least one of the training dataset or the sound effect database, the identified sound of interest for addition to the sound effect database;
wherein the device is further configured to transmit the identified location of interest for use as a feedback to tune a projecting of a sound effect to the environment associated with the identified location of interest; and
wherein the device is further configured to transmit the captured sound for augmentation of the training dataset.

16. The computing device of claim 15, wherein the training dataset comprises an amplitude augmentation to the sound effect data comprising a plurality of quieter and louder amplitude variants of the sound effect data.

17. The computing device of claim 15, wherein the training dataset comprises a persistence augmentation to the sound effect data comprising a plurality of reverberation and non-linear damped variants of the sound effect data.

18. The computing device of claim 15, wherein the training dataset comprises a reverb augmentation to the sound effect data.

19. A method comprising:
deploying a model in a computing device having a processor and a microphone, wherein the model is trained on a training dataset that has been generated from sound effect data retrieved from a sound effect database, wherein the training data set has been expanded, with augmented sound effect data using at least one augmentation of a subset of the sound effect data, wherein the subset comprises data that is tightly segmented and is associated with only one sound, and projected into a plurality of audio domains based at least in part on mixing the augmented sound effect data with at least one background sound consistent with respective ones of the plurality of audio domains
identifying, with the processor employing the model, a sound of interest thereby determining an identified sound of interest;
identifying, with the processor employing the model, a location of interest associated with an environment thereby determining an identity of the location of interest; and
capturing, with the processor employing the model, a sound associated with the environment thereby creating a captured sound.

20. The method of claim 19, further comprising:
transmitting, via the device, to a computer system maintaining the at least one of the training dataset or the sound effect database, the identified sound of interest for addition to the sound effect database;
transmitting, via the device, to the computer system the identified location of interest for use as a feedback to tune a projecting of a sound effect to the environment associated with the identified location of interest; and transmitting, via the device, to a computer system the captured sound for augmentation of the training dataset.

\* \* \* \* \*